United States Patent [19]

Miyake et al.

[11] Patent Number: 5,354,397
[45] Date of Patent: Oct. 11, 1994

[54] SHEET FOR COVERING A SUBSTRATE AND A METHOD FOR PRODUCING A MOLDING USING THE SAME

[75] Inventors: Akitaka Miyake, Ibaraki; Hiroshi Abe, Amagasaki; Yosuke Oshikawa, Miyazaki, all of Japan

[73] Assignee: Sekisui Kagaku Kogyo Kabushiki Kaisha, Osaka, Japan

[21] Appl. No.: 940,944

[22] PCT Filed: Feb. 28, 1992

[86] PCT No.: PCT/JP92/00230

§ 371 Date: Oct. 28, 1992

§ 102(e) Date: Oct. 28, 1992

[87] PCT Pub. No.: WO92/15636

PCT Pub. Date: Sep. 17, 1992

[30] Foreign Application Priority Data

Feb. 28, 1991 [JP] Japan ............................. 3-34234
Jun. 21, 1991 [JP] Japan ............................. 3-150214

[51] Int. Cl.⁵ .............................................. B29C 51/10
[52] U.S. Cl. .......................................... 156/77; 156/78; 156/242; 156/245; 156/285; 428/420; 428/904
[58] Field of Search ................. 156/242, 77, 78; 428/420, 904

[56] References Cited

U.S. PATENT DOCUMENTS

| | | |
|---|---|---|
| 3,663,472 | 5/1972 | Raymond et al. |
| 4,016,326 | 4/1977 | Schaefer. |
| 4,758,470 | 7/1988 | Koyama. |
| 4,820,575 | 4/1989 | Kö428 ........................ 402/ |
| 4,995,926 | 2/1991 | Urai ........................... 156/78 |
| 4,997,707 | 3/1991 | Otawa et al. .............. 156/285 |
| 5,178,708 | 1/1993 | Hara et al. ................ 156/242 |

FOREIGN PATENT DOCUMENTS

| | | |
|---|---|---|
| 0220002 | 4/1987 | European Pat. Off. . |
| 0333198 | 9/1989 | European Pat. Off. . |
| 3117721 | 11/1982 | Fed. Rep. of Germany ...... 428/904 |
| 48-23884 | 8/1970 | Japan . |
| 53-56302 | 5/1978 | Japan .................... 428/904 |
| 55-137278 | 4/1979 | Japan . |
| 56-21868 | 5/1981 | Japan .................... 428/904 |
| 58-12843 | 3/1983 | Japan . |
| 58-186678 | 10/1983 | Japan .................... 428/904 |
| 59-202830 | 11/1984 | Japan . |
| 60-30784 | 7/1985 | Japan .................... 428/904 |
| 62-35513 | 8/1987 | Japan . |
| 62-251111 | 10/1987 | Japan . |
| 2-41243 | 2/1990 | Japan . |
| 2-214650 | 8/1990 | Japan . |
| 3-19981 | 1/1991 | Japan .................... 428/904 |
| 1179321 | 1/1970 | United Kingdom . |
| 2217630 | 11/1989 | United Kingdom . |

OTHER PUBLICATIONS

Hole, L. G. "Poromerics: Their Structure and Use." i Rubber Journal Apr. 1970 pp. 72, 73, 75, 78, 80–83.

*Primary Examiner*—Caleb Weston
*Attorney, Agent, or Firm*—Morrison & Foerster

[57] ABSTRACT

According to the present invention, a surface of a molding is provided with soft touch feeling by making a sheet for covering a substrate having a soft touch layer adhere to the surface of the molding. A covering film having soft touch feeling can easily be formed even on surfaces of products with unevenness and curves. This sheet for covering a substrate has a soft touch layer formed from a resin composition containing at least one substrate selected from the group consisting of elastic beads and a porous inorganic material, and a urethane resin as its main components. This sheet is placed in a mold and a resin is molded in the mold, whereby a molding having soft touch feeling can be obtained. The sheet for covering a substrate has extensibility and is not likely to be broken during the molding.

29 Claims, 2 Drawing Sheets

SHEET FOR COVERING A SUBSTRATE AND A METHOD FOR PRODUCING A MOLDING USING THE SAME

TECHNICAL FIELD

The present invention relates to a sheet for covering a substrate which can give a preferred touch (i.e., soft touch feeling) to a portion where people may touch, e.g., interior of automobiles, housings of Office Automation equipment, household electrical goods, etc., stationery, sanitary goods, daily necessities, and architectural interiors, and which has excellent extensibility; and a method for producing various kinds of moldings using this sheet.

BACKGROUND ART

In order to provide surfaces for plastic moldings or metallic moldings with matt feeling (for example, suede-like soothing external appearance), suede-like covering coats are generally formed using paints. However, in the case where suede-like covering coats are formed on the surfaces of moldings by using paints, it is required to regulate the viscosity or concentration of the paints, resulting in complicated work. Paints containing organic solvents should be used in a booth, and cause problems related to pollution of the working environment and sanitation. Sued-like materials in a sheet shape for covering a substrate have been proposed as alternatives to paints so as to overcome these problems. For example, Japanese Laid-Open Patent Publication No. 2-41243 proposes a suede-like sheet obtained as follows: a bead pigment is added to a vehicle of ionizing radiation curable resin to obtain a lusterless paint, and the matt paint is coated onto a base film with good moldability and cured.

Moreover, an apparatus in which a sheet is decorated while being subjected to injection forming is proposed, for example in Japanese Laid-Open Patent Publication No. 59-202830.

Furthermore, Japanese Laid-Open Patent Publication No. 62-251111 proposes a method for producing a product, comprising the steps of: previously placing a thermoplastic sheet in a drag; introducing a resin in the drag; and pressing the resin in the drag with a cope, thereby obtaining a thermoplastic sheet with decoration adhered to the surface of a molding.

A method for producing a molding by using a sheet for forming is also proposed. Examples of the sheet for forming include thermoplastic resin sheets made of vinyl chloride resins, acrylic resins, acrylonitrile-butadiene-styrene copolymers and the like. Vacuum forming using these sheets is known, and for example, a method for producing a molded laminate is disclosed in Japanese Patent Publication No. 58-12843.

In the case where the surface of a molding is provided with a matt finish by using the above-mentioned suede-like sheets, since a covering film derived from the sheet is made of a resin which is cross-linked by irradiation of an electron beam, the extensibility of the entire sheet is unsatisfactory. For example, when a sheet is adhered to the surface of a substrate having unevenness and curves, the sheet cannot sufficiently be drawn and is sometimes broken. It has been difficult to provide a molding with matt feeling especially for deep drawing.

Since the surface of a molding obtained by using the thermoplastic resin sheet described in the above-mentioned Japanese Patent Publication No. 58-12843 is made of a thermoplastic resin alone, the touch of the molding is hard and the surface of the molding is likely to be scratched. Therefore, the above-mentioned thermoplastic resin sheet is not suitable for producing housings, cases, interior of automobiles, etc. for which soft touch feeling and abrasion resistance are required.

DISCLOSURE OF INVENTION

The sheet of the present invention for covering a substrate overcomes various kinds of problems described in the above-mentioned Background Art. This sheet has a matt finish and a soft and soothing touch, i.e., soft touch feeling (a touch like suede or, baby skin, etc.)

This sheet comprises a soft touch layer formed from a resin composition containing at least one substance selected from the group consisting of elastic beads and a porous inorganic material, and an urethane resin as its main components.

In a preferred embodiment, the urethane resin has a glass transition temperature in the range of $-50°$ C. to $20°$ C.

In a preferred embodiment, the elastic beads are made from a synthetic resin in which a maximal value of its particle diameter distribution is in the range of 1 to 50 $\mu$m.

In a preferred embodiment, the porous inorganic material has an oil absorption in the range of 100 to 400 ml/100 g and an average particle diameter in the range of 1 to 20 $\mu$m.

In a preferred embodiment, the elastic beads are added in an amount in the range of 20 to 400 parts by weight, preferably in the range of 20 to 200 parts by weight based on 100 parts by weight of the urethane resin.

In a preferred embodiment, the porous inorganic material is added in an amount in the range of 5 to 60 parts by weight based on 100 parts by weight of the urethane resin.

In a preferred embodiment, a foamed resin layer or a resin base layer is further formed on the reverse surface of the soft touch layer.

In a preferred embodiment, a foamed resin layer is formed on the reverse surface of the resin base layer.

In a preferred embodiment, an adhesive layer is formed on the reverse surface of the soft touch layer, that of the resin base layer, or that of the foamed resin layer.

A method of the present invention for producing a molding having a substrate made of a resin and a covering sheet laminated on the surface of the substrate, the sheet being formed by the use of the above-mentioned sheet for covering a substrate, the method comprises the steps of: introducing the sheet for covering a substrate into a mold so that a soft touch layer becomes a surface of the molding; introducing a molding resin into the mold, whereby the sheet for covering a substrate and the molding resin are respectively molded, resulting in a molding with a substrate and a covering sheet.

Another method of the present invention for producing a molding having a substrate made of a resin and a covering sheet laminated on the surface of the substrate, the sheet being formed by the use of the above-mentioned sheet for covering a substrate, the method comprises the steps of: previously molding the sheet for covering a substrate in a mold by vacuum forming and/or pressure forming so as to make the soft touch layer the surface of the molding; and introducing a molding resin into the mold, whereby the sheet for covering a substrate and the molding resin are respectively molded, resulting in a molding with a substrate and a covering sheet.

Another method for producing a molding of the present invention comprises the step of molding the above-mentioned sheet for covering a substrate along the inner face of a mold by vacuum forming and/or pressure forming so that the above-mentioned soft touch layer comes to the surface of the molding.

Thus, the present invention makes possible the following objectives of:

(1) providing a sheet for covering a substrate which solves conventional problems such as a space for coating and environmental pollution caused by solvents, etc., and can give a soft touch feeling and matt feeling to the surface of a molding;

(2) providing a sheet for covering a substrate which can relatively easily be adhered to the surface of an article with unevenness or curves, and is capable of forming a covering sheet with a soft touch feeling and matt feeling;

(3) providing a sheet for covering a substrate which is capable of forming a molding whose surface touch is soft and which has an appearance with matt feeling and is excellent in abrasion-resistance;

(4) providing a sheet for covering a substrate with which various kinds of plastic moldings such as housings of OA equipment, household electrical goods, and stationery can easily be decorated at lower cost; and (5) providing a method for producing a molding using a sheet for covering a substrate, by which the above-mentioned molding can easily be produced.

BEST MODE FOR CARRYING OUT THE INVENTION

Figure 1:
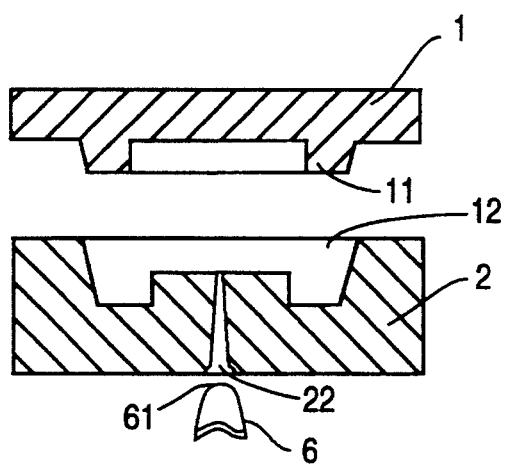
FIG. 1 is a cross-sectional view showing a mold of a injection press machine.

In order to give a soft touch feeling and abrasion-resistance to a sheet having a soft touch layer formed from a resin composition, a urethane resin contained in the above-mentioned resin composition has a glass transition temperature (Tg) preferably in the range of $-50°$ C. to $20°$ C., more preferably in the range of $-50°$ C. to $10°$ C. As to this urethane resin, there are resins of a straight chain type and crosslinking type. Either one of them can be used. In the case where extensibility of the sheet is not particularly required, a urethane resin having a low glass transition temperature is used, and also a great amount of elastic beads and/or a porous inorganic material can be added to the resin composition.

In the case where a urethane resin of a straight chain type is used, there are methods in which the resin composition is directly formed into a film by casting to produce a sheet for covering a substrate; and in which the resin composition is polymerized during casting to produce a sheet for covering a substrate. In the case where a urethane resin of crosslinking type is used, the latter method is preferred for forming a sheet.

The urethane resin used in the present invention is usually obtained by the reaction of diisocyanate, diol, and a chain extender.

Examples of the diisocyanate include tolylene diisocyanate, diphenylmethane diisocyanate, naphthalene diisocyanate, tolidine diisocyanate, p-phenylene diisocyanate, xylylene diisocyanate, bis(isocyanate methyl)-cyclohexane, dicyclohexylmethane diisocyanate, lysine diisocyanate, hexamethylene diisocyanate, isophorone diisocyanate, tetramethylxylylene diisocyanate, trimethylhexamethylene diisocyanate, etc.

Examples of the diol include polyester diol (condensation type polyester diol, lactone type polyester diol, polycarbonate diol, etc.), polyether diol, etc. Examples of the chain extender include ethylene glycol, 1,4-butanediol, hydroquinone diethylol ether, etc.

In the case where a sheet is produced by casting, the material for the above-mentioned urethane resin can previously be polymerized in a solution, whereby the sheet can be obtained by the casting of the above-mentioned solution (in some cases, a catalyst such as di-n-butyltindilaurate is added for the purpose of promoting this reaction). In this case, the urethane resin has a weight average molecular weight preferably in the range of 20,000 to 1,000,000, more preferably in the range of 50,000 to 1,000,000. When the weight average molecular weight is less than 20,000, cracks are likely to be formed in a sheet while the sheet is drawn. When the weight average molecular weight is more than 1,000,000, the urethane resin becomes difficult to be dissolved in a solvent; for example, in the case where the sheet is produced by casting, the urethane resin is subjected to casting only with low concentration because of the high viscosity of the solvent. Thus, it is expensive to produce a thick sheet. In the case where the material for the urethane resin is polymerized during the casting, the above-mentioned low molecular materials and/or high molecular materials obtained by polymerizing the low molecular materials and isocyanate having two functional groups are polymerized by the application of heat during the formation of a film to produce a sheet for covering a substrate.

In the case where a sheet is produced by using a urethane resin of a crosslinking type, the low molecular materials and/or high molecular materials obtained by polymerizing the low molecular materials and isocyanate having three or more functional groups are polymerized by the application of heat during the formation of a film to produce a sheet for covering a substrate, in the same way as in the above-mentioned polymerization during the casting. Isocyanate having three or more functional groups is added as long as the extensibility (curve follower capability) of the sheet is maintained. Examples of this type of isocyanate include an isocyanurate derived from hexamethylene diisocyanate, a trimethylol propane adduct of hexamethylene diisocyanate, etc. As described above, the solvent-resistance of the sheet for covering a substrate can be enhanced by using a partially crosslinked urethane resin. Moreover, a melamine crosslinking agent can be used in addition to isocyanate.

The amount of the urethane resin used in the present invention is preferably 80% by weight or more, usually 50% by weight or more based on the total weight of the resin components including other resins added if required.

The elastic beads used in the present invention have a property of elastic recovery when the beads are pressed until they are deformed and then the pressure is relieved. Examples of the elastic beads include beads made of said synthetic resins such as polyurethane, acrylic resin, polyimide, silicone resin, fluorocarbon resin, urea resin, nylon resin, polyethylene resin, styrene resin, and styrene-isoprene copolymer; and beads in a hollow balloon shape (hollow foam) made of vinylidene chloride-acrylonitrile copolymer, etc. It is preferred that the elastic beads have a tensile modulus (Young's modulus of elasticity) in the range of $10^7$ to $10^{10}$ dyn/cm$^2$ at 25° C.

In general, the elastic beads having a local maximum of the particle diameter distribution in the range of 1 to 50 μm is preferably added in an amount in the range of 20 to 400 parts by weight (hereinafter, the term parts by weight is referred to as parts), more preferably in the range of 20 to 200 parts based on 100 parts of the urethane resin. The beads in a hollow balloon shape are preferably added in an amount in the range of 3 to 20 parts. When the local maximum of the particle diameter distribution of the elastic beads is less than 1 μm, it is difficult to give a sufficiently soft touch feeling to the sheet obtained. When the added amount is more than the above-mentioned range, cracks are likely to be formed on the surface of the sheet when the sheet is drawn. Two or more kinds of elastic beads can be used, instead of using one kind of elastic bead.

Examples of the porous inorganic material used in the present invention include hydrated silic acid (SiO$_2$.xH$_2$O), hydrated aluminum silicate (Al$_2$O$_3$9SiO$_2$.xH$_2$O), natural diatomaceus earth, etc. In general, an inorganic material referred to as white carbon is preferably used.

The mean particle diameter of the porous inorganic material is varied in accordance with the thickness of a sheet obtained. For example, when a sheet with a thickness of 100 μm or less is obtained, the mean particle diameter is preferably 30 μm or less, more preferably in the range of 1 to 20 μm. When the particle diameter is more than 30 μm, unevenness on the surface of a covering film obtained becomes large and an excellent soft touch feeling cannot be obtained. Moreover, cracks are likely to be formed on the surface of the sheet while the sheet is drawn.

Furthermore, in general, as to the porous material, there is oil absorption as means for representing the degree of porosity. The oil absorption is varied in accordance with properties of a binder such as urethane resin and the low molecular substance which is used. For example, in the case where the compatibility between the binder used and the inorganic material is satisfactory, since a great amount of the binder is held by the inorganic material, the oil absorption of the porous inorganic material is preferably 50 ml/100 g or more, more preferably in the range of 100 to 400 ml/100 g. When the oil absorption is less than 50 ml/100 g, the added amount of the inorganic material should be increased in order to make the surface of the sheet rough (uneven surface); as a result, the covering film formed becomes hard and excellent soft touch feeling cannot be obtained.

The added amount of the porous inorganic material is varied in accordance with the thickness of the sheet obtained, compatibility between the porous inorganic material and the binder, etc. For example, when the sheet with a thickness of 100 μm is obtained, the above-mentioned porous inorganic material is preferably added in an amount in the range of 10 to 40 parts based on 100 parts of the urethane resin. When the added amount is less than 10 parts, the surface of a covering sheet is not sufficiently made rough and an excellent soft touch feeling cannot be obtained. When the added amount is more than 40 parts, cracks are likely to be formed on the surface of the sheet while the sheet is drawn. A typical added amount of the porous inorganic material is in the range of 5 to 60 parts based on 100 parts of the urethane resin. Two kinds or more porous inorganic materials can be used, instead of using one kind of porous inorganic material. Moreover, these inorganic materials can be used together with the above-mentioned elastic beads.

If required, materials, e.g., colorants such as a pigment and a dye, an antioxidant, a UV absorber, hindered amine, and a flame retardant can be added to the resin composition.

As the colorant, a pigment and a dye which are generally used in a paint can be used. Examples of the pigment include titanium oxide, iron oxide, carbon black, a cyanine type pigment, and a quinacridone type pigment. Examples of the dye include an azo type dye, an anthraquinone type dye, an indigoid type dye, and a stilbene type dye. Metallic powders such as an aluminum flake, a nickel powder, a gold powder, and a silver powder can be used as the colorant. It is preferred that these materials have a particle diameter as small as possible. In the case of a colorant having high hiding power, the added amount thereof is preferably in the range of 2 to 400 parts based on 100 parts of the solid content of the resin. However, soft touch feeling of the sheet given by the elastic beads and the inorganic material is varied by the addition of the colorant, so that the amount of the elastic beads and the porous inorganic material contained in the sheet sometimes deviate from the above-mentioned range in the case of a sheet containing colorant.

In order to give various kinds of properties to a sheet of the present invention for covering a substrate, materials for providing various kinds of properties can be added to the resin composition.

Examples of the materials for providing various kinds of properties include a conductive material, an anti-fogging agent, a photochromic compound, a rust preventive, etc.

(Shape of a sheet)

At least one substance selected from the group consisting of the elastic beads and the porous inorganic material, the urethane resin, and if required, the above-mentioned respective special property producing materials are mixed and dispersed to obtain a resin composition. A soft touch layer is formed from the resin composition, and in the case where a sheet for covering a substrate is a single layer, the soft touch layer directly becomes the sheet for covering a substrate.

As described above, the sheet of the present invention for covering a substrate can be a single layer formed of the soft touch layer or can be multilayered. In the case where the sheet for covering a substrate is a single layer, for the purpose of improving a design property of the sheet, one face (front face or reverse surface) or both faces of the soft touch layer can be subjected to printing (patterning) by gravure printing, silk printing, offset printing or the like.

In the case where the sheet for covering a substrate is a multi-layer, for example, there are the following shapes:

① A sheet having a soft touch layer (surface layer) and a resin base layer (back surface layer) formed on the reverse surface of the soft touch layer This resin base layer is provided for the purpose of improving adhesion with respect to a molding resin, withstanding shear stress of the molding resin, or further improving the handling property of the sheet for covering a substrate, in the case where the sheet for covering a substrate is used for injection forming, stamping, or the like.

When the soft touch layer is transparent, the resin base layer can be colored. This colored resin base layer can be formed from a resin composition used for the soft touch layer, or a resin composition which contains neither the elastic beads nor the inorganic material. In the case where the adhesion between the soft touch layer and the resin base layer is poor, a primer layer can be provided therebetween.

As a material for forming the resin base layer, in order to obtain adhesion with respect to the molding resin, a resin which is of the same kind as that of the molding resin or excellent in compatibility with respect to the molding resin is preferred. Moreover, the sheet is drawn, if required and adhered to a substrate, so that the resin base layer is preferably formed from a material having extensibility at ordinary temperature or at least under heating.

Examples of the resin used for the resin base layer include thermoplastic resins such as polystyrene, acrylic polymer, polycarbonate, polyvinyl chloride, polyethylene, polypropylene, ABS (acrylonitrile-butadiene-styrene copolymer), modified polyphenyleneoxide, polyphenylenesulfide, polyetherimide, polyetheretherketone, and ionomer; or thermoplastic elastomer resins such as olefin type resins, urethane type resins, and polyester type resins. The surface (soft touch layer side) of the resin base layer or the surface of the soft touch layer can be subjected to printing.

② A sheet having a soft touch layer and a foamed resin layer formed on the reverse surface of the soft touch layer This foamed resin layer may directly be formed on the reverse surface of the soft touch layer or may be formed on the reverse surface of the resin base layer of the sheet shown in the above-mentioned item ①.

Examples of a material for the foamed resin layer include expandable resin materials, e.g., polyolefin type resins such as polyethylene and polypropylene; polystyrene type resins such as polystyrene and stryrene-maleic anhydride copolymer; polyurethane type resins; polyvinyl chloride type resins; and various kinds of thermoplastic elastomer resins. The foamed resin layer is made of a foam constituted of the above material. The expansion ratio of these foams is preferably in the range of 5 to 40, more preferably in the range of 20 to 40 so as to give a soft touch feeling. In the case where the adhesion between the foamed resin layer made of the foam and the soft touch layer or the resin base layer is poor, a primer layer can be provided therebetween. The thickness of the foamed resin layer can be varied in accordance with purposes of the sheet; for example, it is preferably in the range of 0.5 to 3.0 mm for automobiles. As to a closed cell ratio which is an index for the foam, a higher ratio is better in the case where the primer layer is formed; however, there is no particularly preferred range for giving a soft touch feeling.

③ A sheet having a soft touch layer and an adhesive layer formed on outermost the reverse surface of the soft touch layer In the case of a sheet only made of the above soft touch layer, an adhesive layer is formed on the reverse surface of the soft touch layer. In the case of the sheet in item ①, the adhesive layer is formed on the reverse surface of the resin base layer; and in the case of the sheet in item ②, the adhesive layer is formed on the reverse surface of the foamed resin layer. This adhesive layer can include a primer layer.

The adhesive layer is provided for the purpose of enabling the sheet for covering a substrate to be used as wall paper, enabling a sheet for covering a substrate to be easily adhered to furniture, stationery, sanitary goods, household electrical goods, interior of automobiles, etc., or improving adhesion between the sheet for covering a substrate and the molded resin during molding such as extrusion molding and pultrusion, or after molding (preferably shortly after molding).

The above-mentioned primer layer is provided for the purpose of improving adhesion between the sheet for covering a substrate and a resin molded by injection forming, etc.

As an adhesive used for the adhesive layer, a pressure-sensitive adhesive is used for the purpose of easy adhesion of the sheet; and a solvent adhesive, a hot-melt adhesive, or an after cure adhesive is preferably used for the purpose of enhancing adhesion between the sheet and the molded resin (shortly) after molding.

In order to satisfy adhesive performance, these adhesives can be mixed in combination. Also, in the case where one kind of adhesive cannot achieve satisfactory adhesion because the adhesion of the materials of the sheet and the substrate is poor, a plurality of different kinds of adhesive layers can successively be formed.

Examples of the pressure-sensitive adhesive and the solvent type adhesive include rubber type, acrylic type, urethane type, and silicone type adhesives.

Examples of the hot-melt adhesive include ethylene-vinylacetate copolymer (EVA) type and styrene-isoprene-styrene block copolymer (SIS) type adhesives.

An example of the after cure adhesive include a microcapsule type adhesive. As the material for the after cure adhesive, there are uncrosslinked unsaturated polyester type adhesives, uncrosslinked acrylic adhesives, etc. As a primer for adhesion with respect to olefin type resins, chlorinated polypropylene or chlorinated polypropylene which is further oxidized is used. In order to further improve adhesion, an urethane resin is sometimes added to these materials in an amount of about 20% by weight.

④ A sheet having a soft touch layer and a protective layer formed on the surface of the soft touch layer A protective layer is formed on the soft touch layer in order to give a shape-retaining property to the sheet for covering a substrate while the sheet is stored or used and to give a surface protective property to the sheet after being adhered.

Since the sheet for covering a substrate is drawn, if required and adhered to a substrate, the protective layer is preferably made of a film (e.g., a thermoplastic resin film or a rubber film) having extensibility at ordinary temperature or at least under heating.

Examples of the thermoplastic resin films include resin films made from plasticized polyvinyl chloride, polyurethane, an acrylic resin, polyester, ethylene-vinyl acetate copolymer, polyethylene, polypropylene, etc.

Examples of the rubber films include rubber films made of natural rubber, styrene-butadiene rubber, nitrile-butadiene rubber, isoprene rubber, butadiene rubber, chloroprene rubber, urethane rubber, silicone rubber, acrylic rubber, etc. A film made of a mixture of the thermoplastic resin and rubber can be used, or a film made of the thermoplastic resin and a film made of rubber can be layered.

The protective layer can be used only for the purpose of protecting the surface of a substrate until the substrate is used. In this case, the protective layer is peeled off from the surface of the soft touch layer when the substrate is used. If the surface of the protective layer is provided with embossments or patterns, the surface shape (external appearance) of the soft touch layer can be varied by peeling off the protective layer.

The thickness of the sheet for covering a substrate shown in the above-mentioned items 1 to 4 can be arbitrarily varied in accordance with purposes. In the case where the sheet is adhered to the surface of a substrate with unevenness, the thickness of the sheet is preferably in the range of about 20 to 1,000 μm, and in the case where the sheet is adhered to a flat substrate, the thickness thereof can be in the range of about 10 to 500 μm. Moreover, the thickness of other layers which are formed on the above-mentioned sheet is usually in the range of 10 to 500 μm, and in particular, the thickness of the adhesive layer is preferably in the range of 10 to 100 μm.

(Preparation of a sheet for covering a substrate)

The sheet of the present invention for covering a substrate can be prepared by any method. In the case where the sheet is formed in a single layer form, the following casting method and spray method are preferred.

First, the resin composition is sufficiently dissolved and dispersed in an organic solvent. A solution obtained is then coated onto a process sheet (usually, a polyethylene terephthalate film or paper, the surface of which is treated with silicone) by using a knife coater, a bar coater, a reverse-roll coater, a gravure-roll coater, a spray, etc. The sheet obtained is dried so as to remove the solvent, thereby forming a soft touch layer. The sheet for covering a substrate is obtained by peeling off the process sheet from the soft touch layer.

In the case where the sheet is formed in a multi-layered form, it can be obtained by the casting method, the lamination method, or the spray method.

As to the casting method and the spray method, there are two methods in which both a soft touch layer and a layer formed on the soft touch layer are subjected to casting or spraying; and in which only the soft touch layer is formed on the other layer by casting or spraying.

The former method comprises the steps of: casting or spraying a solution containing a resin composition forming either one of the layers onto a process sheet; forming a layer by drying the resulting process sheet so as to remove any solvent; casting or spraying a solution containing a resin composition forming the other layer onto the layer obtained; and forming the other layer by drying the resulting process sheet.

In the latter method, a sheet to be layered is previously formed, after which another layer is formed on the sheet by casting or spraying, followed by drying of the solvent.

According to the lamination method, resin compositions forming respective layers are previously formed into sheets, and both sheets are laminated and adhered (by heating, if required) to each other by roller press. At this time, in order to improve the adhesion between the sheets, a primer layer (adhesive layer) can be disposed therebetween.

The process sheet used for the production of the sheet for covering a substrate can be used as a protective sheet.

(Method for using a sheet for covering a substrate)

As described below, there are various methods for using a sheet of the present invention for covering a substrate.

① A sheet for covering a substrate is directly adhered to the surface of a member.

In the case where the sheet is adhered to long members made of a material such as a wooden material or an aluminum sash, a commercially available profile laminator can be used.

At this time, it is preferred that an adhesive layer is disposed on the sheet for covering a substrate so as to make adhesion with respect to a member (substrate) satisfactory. In general, a sheet for covering a substrate on which a pressure-sensitive adhesive is disposed can be adhered to the surface of a substrate by using hands, a double vacuum forming machine (machine for adhesion), etc.

② Only a sheet of the present invention for covering a substrate is formed, and the sheet obtained is directly used as a molding.

In this case, a sheet for covering a substrate in which a resin base layer is formed on the reverse surface of a soft touch layer or a sheet for covering a substrate in which a foamed resin layer is further formed on the reverse surface of the resin base layer can be molded along a mold face by vacuum forming and/or pressure forming so that the soft touch layer is positioned at the front surface of a molding.

③ A sheet for covering a substrate is introduced into a mold, and the sheet is adhered to the surface of a base formed from a resin in the mold, thereby producing a molding.

There are, for example, the following methods.

(i) As in the injection forming and the injection press, a sheet for covering a substrate is previously introduced into a mold, and at the same time that a resin is molded, the sheet is adhered to the surface of a base formed from this resin, thereby producing a molding.

According to this method, the sheet for covering a substrate is introduced into a mold so that the soft touch layer thereof is positioned at the front surface of a molding. Then, the sheet is closely contacted with the inside of the mold at ordinary temperature or by heating, using vacuum forming and/or pressure forming. After that, ordinary molding is conducted.

(ii) A sheet for covering a substrate is previously molded by vacuum forming or pressure forming so that a soft touch layer of the sheet is positioned at the front surface of a molding. Then, the sheet for covering a substrate is inserted along the inner face of a mold, and a resin to be molded is introduced into the mold to obtain a molding.

(iii) According to the method in which moldings are successively produced as in extrusion molding, pultrusion, etc., a sheet for covering a substrate is introduced into a die, and the sheet is adhered to the surface of a molding at the same time that moldlings are successively produced. Alternatively, after sizing or cooling the molding, the sheet can be adhered to the molding.

In this case, according to the method in which the sheet for covering a substrate is introduced into the die, the sheet is rolled in the front of the die or in the middle thereof. According to the method in which the sheet for covering a substrate is adhered to the molding (shortly) after molding, the sheet is adhered along the surface of the molding by using a pressure roller.

(iv) While a sheet for covering a substrate is molded by vacuum forming and/or pressure forming, the sheet is adhered to a core member, for example, the surface of a resin molding or a molding obtained by hardening phenol and wooden material, which is treated with an adhesive or the like, thereby producing a laminate.

As to the molding resin used in the above, any materials which are usually molded can be used. Examples of these materials include ABS (acrylonitrile-butadiene-styrene copolymer), polyvinyl chloride, polystyrene, polycarbonate, acrylic resin, polyethylene, polypropylene, modified polyphenyleneoxide, polyetherimide, polyphenylenesulfide, nylon, thermosetting resins containing a glass fiber, and reaction molding materials such as urethane.

(Use of a sheet for covering a substrate)

The sheet of the present invention for covering a substrate gives a soft touch feeling and matt feeling to the surface of a product, so that it can be used for any parts which a human being can directly touch or see.

Examples of interior members of automobiles include an instrument panel, a dashboard, a handle, a gear lever knob, a door knob, an arm rest, various kinds of switches, a seat, a ceiling material, a door material, a console box, etc.

Examples of housings for household electrical goods include portable produces (e.g., a telephone, a cassette tape recorder, a compact disk, a television, etc.), a telephone, a refrigerator, a television, switches of these goods, etc.

Examples of housings for OA products include a personal computer, a printer, a key board, etc.

Examples of furniture products include chairs, desks, tables, wardrobes, and handles thereof, etc.

Examples of architectural interior structures include sashs, splints, various kinds of doors, wall paper, sanitary goods (seats, handles), etc.

Examples of bath products include bathtubs, chairs, mats, shelves, etc.

Examples of sports goods include grips of bats, rackets, golf clubs, and the like, a pat for defense, etc.

Examples of daily goods and stationery include various kinds of housings, cases for storage, containers, covers of a vending machine, benches, stands, sofas, pillows, etc.

Examples of products for care of the aged include a handrail for a bathroom, a knob, handrails for a bed, a wheel chair, slippers, etc.

As described above, soft touch feeling can easily be given to a molding just by adhering the sheet to the surface of a substrate of the molding. Thus, as in the case where the conventional soft touch paints are used, a space for coating is not required, and there causes no inferior effects on working environment due to a solvent.

Moreover, since the sheet for covering a substrate is excellent in extensibility, the sheet can be adhered to an substrate with unevenness without forming crackes in the sheet even though the sheet is drawn.

In particular, when a soft touch resin layer is formed from a resin composition consisting essentially of a urethane resin with a glass transition temperature of $-50°$ to $20°$ C. and elastic beads and/or a porous inorganic material, a sheet having this soft touch layer is molded into a predetermined shape by ordinary vacuum forming and/or pressure forming, whereby a molding with soft touch feeling can be produced.

Details of materials used in the following examples are as follows.

The term "parts" refers to "parts by weight". As to a urethane resin and isocyanate, parts by weight of solid content alone are represented so as to make a mixing ratio with respect to other materials easily understood.

More specifically, for example, an actual mixed amount of Urethane resin A in Example 1 of item (C) Preparation of a sheet for covering a substrate is 222 parts by weight, and that of Isocyanate A is 13.3 parts by weight.

(A) Materials used:

(A)—1 Urethane resin

Urethane resin A: manufactured by Nippon Polyurethane Industry Co., Ltd. NIPPOLAN 5037, 45% solid content (Urethane resin A was used by being mixed with the following isocyanate in Examples 1 and 2. After the addition of isocyanate, $Tg = -17°$ C. and weight average molecular weight 200,000.)

Urethane resin B: manufactured by Nippon Polyurethane Industry Co., Ltd. NIPPOLAN 5120, $Tg = -33°$ C., weight average molecular weight 100,000, and 30% solid content.

Urethane resin C: manufactured by Nippon Polyurethane Industry Co., Ltd. NIPPOLAN 5232, $Tg = 8°$ C., weight average molecular weight 70,000, and 30% solid content.

(A)—2 Elastic beads

Elastic beads A: manufactured by NIPPON SHOKUBAI Co., Ltd. EBS100, elastic beads of an acrylic resin, mean particle diameter 10 $\mu$m, and Young's modulus of elasticity $5 \times 10^8$ dyn/cm$^2$.

Elastic beads B: manufactured by NIPPON SHOKU-BAI Co., Ltd. EBS300, elastic beads of an acrylic resin, mean particle diameter 30 μm, and Young's modulus of elasticity $5 \times 10^8$ dyn/cm$^2$.

Elastic beads C: manufactured by Sekisui Plustics Co., LTD. SBX-6, elastic beads of polystyrene, mean particle diameter 6 μm, and Young's modulus of elasticity $1 \times 10^9$ dyn/cm$^2$.

Elastic beads D: manufactured by Sekisui Plustics Co., LTD. EAX-20, elastic beads of an acrylic resin, mean particle diameter 20 μm, and Young's modulus of elasticity $8 \times 10^7$ dyn/cm$^2$.

Hollow balloon: manufactured by Japan Fillite Co., LTD. a hollow foam of a vinylidene chloride-acrylonitrile copolymer, EXPANCEL DE 551, and mean particle diameter 40 μm.

(A)—3 Porous inorganic material

Porous inorganic material A: manufactured by Fuji Davison Chemical Ltd., silicon dioxide, SYLOID 72, mean particle diameter 2.5 μm, and oil absorption 220 ml/100 g.

Porous inorganic material B: manufactured by Fuji Davison Chemical Ltd., silicon dioxide, SYLOID 244, mean particle diameter 1.8 μm, and oil absorption 310 ml/100 g.

Porous inorganic material C: manufactured by Fuji Davison Chemical Ltd., silicon dioxide, SYLOID 620, mean particle diameter 12 μm, and oil absorption 180 ml/100 g.

(A)—4 Isocyanate

Isocyanate A: manufactured by Nippon Polyurethane Industry Co., Ltd. COLONATE HL hexamethylenediisocyanate of trimethylolpropane adduct type, solid content 75%, and NCO%=12.5%.

Isocyanate B: hexamethylene diisocyanate, solid content 100%, and NCO%=50%.

(A)—5 Curing catalyst

Di-n-butyltindilaurate (A)—6 Polyethylene terephthalate molding release sheet (hereinafter, referred to as PET sheet)

manufactured by Lintec Co., Ltd., 3801, thickness 38 μm, and a sheet treated with silicone so as to be released.

(A)—7 Acrylonitrile-butadiene-stylene sheet (hereinafter, referred to as ABS sheet)

ABS sheet A: manufactured by Sambow Plastics Co., Ltd., A106, and thickness 500 μm.

ABS sheet B: manufactured by Sambow Plastics Co., Ltd., A205, and thickness 500 μm.

(A)-8 Polyvinyl chloride sheet (hereinafter, referred to as PVC sheet)

PVC sheet A: manufactured by Tsutsunaka Plastic Industry Co., Ltd., KAIDAK, and thickness 3 mm.

PVC sheet B: manufactured by sambow Plastics Co., Ltd., thickness 0.5 mm, a semi-rigid polyvinyl chloride sheet for vacuum molding.

KAIDAK manufactured by Tsutsunaka Plastic Co., Ltd., and thickness 3 mm.

(A)—9 Foam sheet

Urethane foam sheet A: a urethane sheet, thickness 500 μm, and expansion ratio

Urethane foam sheet B: a urethane sheet, thickness 300 μm, and expansion ratio 30.

Urethane foam sheet C: a urethane sheet, thickness 500 μm, and expansion ratio 20.

Urethane foam sheet D: a urethane sheet, thickness 3000 μm, and expansion ratio 30.

Urethane foam sheet E: a urethane sheet, thickness 300 μm, and expansion ratio 20.

Urethane foam sheet F: a flexible urethane sheet, thickness 2 mm, and expansion ratio 4.

PVC foam sheet: a PVC sheet, thickness 500 μm, and expansion ratio 35.

Polyethylene foam sheet A: a polyethylene sheet, thickness 2 mm, and expansion ratio 20.

Polyethylene foam sheet B: a polyethylene sheet, thickness 2 mm, and expansion ratio 30.

(A)—10 Elastomer sheet

Elastomer sheet A: an olefin type elastomer sheet (thickness 350 μm) formed by calender molding, whose surface is treated with chlorinated propylene type primer (thickness 5 μm).

Elastomer sheet B: a urethane type elastomer sheet (thickness 500 μm) formed by calender molding.

Elastomer sheet C: an olefin type elastomer sheet (thickness 2 mm) formed by calender molding, whose surface is treated with chlorinated propylene type primer (thickness 5 μm).

Elastomer sheet D: an olefin type elastomer sheet (thickness 3 mm) formed by calender molding, whose surface is treated with chlorinated propylene type primer (thickness 5 μm).

Polypropylene sheet: a polypropylene sheet (thickness 1 mm) formed by calender molding, whose surface is treated with chlorinated propylene type primer (thickness 5 μm).

(A)—11 Adhesive

Adhesive A: an acrylic adhesive (manufactured by Soken Kagaku K. K., SK DINE P-103, and 30 μm).

Adhesive B: SIS adhesive (manufactured by Shell Chemical Co., Ltd., CALIFLEX TR 1117, and 30 μm).

(A)—12 Molding resin

Polystyrene (PS): manufactured by Mitsubishi Monsanto Chemical Company, HT-516.

Polyethylene: manufactured by Mitsubishi Petro Co., HD-JX10.

ABS resin: manufactured by Denki Kagaku Kogyo K. K., ABS-ME.

Polypropylene (PP): manufactured by Mitsubishi Petro Co., PP-MA2A.

Acrylic resin: manufactured by Mitsubishi Rayon Co., Ltd., ACRYPET VH.

Vinyl chloride resin: manufactured by Shin-Etsu Chemical Co., Ltd., TK-1000.

Polyester resin: manufactured by Japan Upika Co., Ltd., UPIKA3510.

(B) Evaluations of a sheet for covering a substrate:

(B)—1 Adhesion test

A 100-square checkerboard pattern with 1-mm spacings was inscribed on the surface of a molding onto which a sheet for covering a substrate had been adhered, and commercially available adhesive tape was adhered onto the resulting surface. After that, the adhesive tape was peeled off and the number of squares left on the surface was counted.

(B)—2 Soft touch feeling

Soft touch feeling was evaluated by a sensory test using feeling of the following panelists who touched the surface of the mold.

Panelists: age 15 to 40, total 20 men and women

Evaluation grades: 3 . . . soft feeling 2 . . . relatively soft felling 1 . . . no soft feeling The total evaluation grades of the panelists of 55 points or more were considered as satisfactory.

(B)—3 Appearance

An appearance was observed, and the case, in which no abnormal conditions such as cracks were found and matt finish was obtained, was considered as satisfactory.

(C) Preparation of sheets for covering a substrate:

EXAMPLE 1

| Urethane resin A: | 100 parts |
|---|---|
| Isocyanate A: | 10 parts |
| Curing catalyst: | 0.5 parts |
| Elastic beads A: | 80 parts |
| Titanium oxide: | 30 parts |

The above-mentioned components were mixed with stirring to obtain a resin composition.

The resulting resin composition was coated onto a PET sheet and dried at 80° C. for 15 minutes, whereby a soft touch layer was formed. The thickness of the soft touch layer was 60 μm. After that, the PET sheet was peeled off from the soft touch layer and a sheet of Adhesive B (with a thickness of 30 μm) was laminated on a surface of the soft touch layer from which the PET sheet was peeled off to obtain a sheet for covering a substrate.

EXAMPLE 2

| Urethane resin A: | 100 parts |
|---|---|
| Isocyanate B: | 2 parts |
| Curing catalyst: | 0.5 parts |
| Porous inorganic material A: | 20 parts |

The above-mentioned components were mixed with stirring to obtain a resin composition.

The resulting resin composition was coated onto a PET sheet and dried at 80° C. for 15 minutes, whereby a soft touch layer was formed. The thickness of the soft touch layer was 100 μm. After that, the PET sheet was peeled off from the soft touch layer and a sheet of Adhesive A (with a thickness of 30 μm) was laminated on a surface of the soft touch layer from which the PET sheet was peeled off to obtain a sheet for covering a substrate.

EXAMPLE 3

| Urethane resin B: | 100 parts |
|---|---|
| Elastic beads B: | 200 parts |
| Carbon black: | 4 parts |

The above-mentioned components were mixed with stirring to obtain a resin composition.

The resulting resin composition was coated onto ABS sheet A and dried at 80° C. for 5 minutes to form a soft touch layer, whereby a sheet for covering a substrate was obtained. The thickness of the soft touch layer (the thickness of the sheet excluding the ABS sheet) was 100 μm.

EXAMPLE 4

| Urethane resin C: | 100 parts |
|---|---|
| Elastic beads C: | 40 parts |

The above-mentioned components were mixed with stirring to obtain a resin composition.

The resulting resin composition was coated onto a PET sheet and dried at 80° C. for 15 minutes, whereby a soft touch layer was formed. The thickness of the soft touch layer was 100 μm. After that, the PET sheet was peeled off from the soft touch layer and grain of stone patterns were printed by gravure printing on a surface of the soft touch layer from which the PET sheet was peeled off. Moreover, a sheet of Adhesive A (with a thickness of 30 μm) was laminated on the printed surface of the soft touch layer to obtain a sheet for covering a substrate.

EXAMPLE 5

| Urethane resin B: | 100 parts |
|---|---|
| Elastic beads D: | 80 parts |
| Carbon black: | 1 part |

The above-mentioned components were mixed with stirring to obtain a resin composition.

The resulting resin composition was coated onto ABS sheet A (which was printed with grain of wood patterns by gravure printing) and dried at 80° C. for 15 minutes to obtain a soft touch layer, whereby a sheet for covering a substrate was obtained. The thickness of the soft touch layer (the thickness of the sheet excluding the ABS sheet) was 100 μm.

EXAMPLE 6

| Urethane resin B: | 100 parts |
|---|---|
| Porous inorganic material B: | 20 parts |
| Carbon black: | 1 part |

The above-mentioned components were mixed with stirring to obtain a resin composition.

The resulting resin composition was coated onto PVC sheet A (which was printed with grain of wood patterns by gravure printing) and dried at 80° C. for 30 minutes to obtain a soft touch layer, whereby a sheet for covering a substrate was obtained. The thickness of the soft touch layer (the thickness of the sheet excluding the PVC sheet) was 100 μm.

EXAMPLE 7

| Urethane resin C: | 100 parts |
|---|---|
| Porous inorganic material A: | 25 parts |

The above-mentioned components were mixed with stirring to obtain a resin composition.

The resulting resin composition was coated onto ABS sheet A and dried at 80° C. for 5 minutes to obtain a soft touch layer, whereby a sheet for covering a substrate was obtained. The thickness of the soft touch layer (the thickness of the sheet excluding the ABS sheet) was 100 μm.

EXAMPLE 8

| Urethane resin B: | 100 parts |
|---|---|
| Porous inorganic material C: | 30 parts |
| Carbon black: | 1 part |

The above-mentioned components were mixed with stirring to obtain a resin composition.

The resulting resin composition was coated onto ABS sheet A and dried at 80° C. for 5 minutes to obtain a soft touch layer, whereby a sheet for covering a substrate was obtained. The thickness of the soft touch layer (the thickness of the sheet excluding the ABS sheet) was 80 μm.

EXAMPLE 9

The resin composition used in Example 1 was coated onto Urethane foam sheet A and dried at 80° C. for 5 minutes to form a soft touch layer. The thickness of the soft touch layer was 100 μm, and that of the foamed resin layer was 500 μm. After that, a sheet of Adhesive B (with a thickness of 30 μm) was laminated on the reverse surface of the foamed resin layer to obtain a sheet for covering a substrate.

EXAMPLE 10

The resin composition used in Example 2 was coated onto Urethane foam sheet B and dried at 80° C. for 5 minutes to form a soft touch layer, whereby a sheet for covering a substrate was obtained. The thickness of a foamed resin layer of the sheet was 300 μm, and that of the soft touch layer was 100 μm.

EXAMPLE 11

The resin composition used in Example 3 was coated onto Urethane foam sheet C and dried at 80° C. for 5 minutes to form a soft touch layer, whereby a sheet for covering a substrate was obtained. The thickness of a foamed resin layer of the sheet was 500 μm, and that of the soft touch layer was 100 μm.

EXAMPLE 12

The resin composition used in Example 4 was coated onto Urethane foam sheet A by gravure printing and dried at 80° C. for 5 minutes to form a soft touch layer, whereby a sheet for covering a substrate was obtained. The thickness of a foamed resin layer of the sheet was 500 μm, and that of the soft touch layer was 100 μm.

EXAMPLE 13

The resin composition used in Example 5 was coated onto a PVC foam sheet and dried at 80° C. for 5 minutes to form a soft touch layer, whereby a sheet for covering a substrate was obtained. The thickness of a formed resin layer of the sheet was 500 μm, and that of the soft touch layer was 100 μm.

EXAMPLE 14

| Urethane resin B: | 100 parts |
|---|---|
| Porous inorganic material B: | 20 parts |

The above-mentioned components were mixed with stirring to obtain a resin composition.

The resulting resin composition was coated onto a PVC foam sheet and dried at 80° C. for 5 minutes to obtain a soft touch layer. The thickness of the foamed resin layer was 500 μm, and that of the soft touch layer was 100 μm. After that, a sheet of Adhesive B (with a thickness of 30 μm) was laminated on a reverse surface of the PVC foam sheet to obtain a sheet for covering a substrate.

EXAMPLE 15

The resin composition used in Example 7 was coated onto Urethane foam sheet D and dried at 80° C. for 5 minutes to form a soft touch layer, whereby a sheet for covering a substrate was obtained. The thickness of the foamed resin layer of the sheet was 3000 μm, and that of the soft touch layer was 100 μm.

EXAMPLE 16

The resin composition used in Example 8 was coated onto Urethane foam sheet B and dried at 80° C. for 5 minutes to form a soft touch layer, whereby a sheet for covering a substrate was obtained. The thickness of the foamed resin layer of the sheet was 300 μm, and that of the soft touch layer was 50 μm.

EXAMPLE 17

| Urethane resin B: | 100 parts |
|---|---|
| Hollow balloon: | 10 parts |

The above-mentioned components were mixed with stirring to obtain a resin composition.

The resulting resin composition was coated onto a surface of Elastomer sheet A and dried at 80° C. for 30 minutes to obtain a soft touch layer. The thickness of the soft touch layer was 60 μm.

A polyethylene foam sheet A was laminated on a reverse surface of Elastomer sheet A (opposite face of the soft touch layer) at 150° C. to obtain a sheet for covering a substrate.

EXAMPLE 18

| Urethane resin C: | 100 parts |
|---|---|
| Porous inorganic material A: | 25 parts |

The above-mentioned components were mixed with stirring to obtain a resin composition.

The resulting resin composition was coated onto Elastomer sheet A and dried at 80° C. for 30 minutes to obtain a soft touch layer. The thickness of the soft touch layer was 40 μm.

Polyethylene foam sheet A was laminated on a reverse surface of Elastomer sheet A at 150° C. to obtain a sheet for covering a substrate.

EXAMPLE 19

| Urethane resin B: | 100 parts |
|---|---|
| Elastic beads B: | 150 parts |

The above-mentioned components were mixed with stirring. Then, the solvent was removed from the mixture and the mixture was Ground to obtain a resin composition.

The resulting resin composition was molded by calendering. Then, the surface thereof was laminated on Olefin type elastomer sheet A used in Example 17 and dried at 80° C. for 30 minutes to obtain a soft touch layer. The thickness of the soft touch layer was 150 μm.

Polyethylene foam sheet A was laminated on a reverse surface of Elastomer sheet A at 150° C. to obtain a sheet for covering a substrate.

EXAMPLE 20

| Urethane resin C: | 100 parts |
|---|---|
| Porous inorganic material A: | 25 parts |

The above-mentioned components were mixed with stirring to obtain a resin composition.

The resulting resin composition was coated onto Urethane elastomer sheet B and dried at 80° C. for 30 minutes to obtain a soft touch layer. The thickness of the soft touch layer was 40 μm.

Urethane foam sheet F was laminated on a reverse surface of Elastomer sheet B at 120° C. to obtain a sheet for covering a substrate.

EXAMPLE 21

The resin composition used in Example 1 was coated onto ABS sheet A and dried at 80° C. for 15 minutes to form a soft touch layer, whereby a sheet for covering a substrate was obtained. The thickness of the soft touch layer of the sheet for covering a substrate obtained (the thickness of the sheet excluding the ABS sheet) was 100 μm.

EXAMPLE 22

The resin composition used in Example 2 was coated onto ABS sheet A and dried at 80° C. for 15 minutes to form a soft touch layer, whereby a sheet for covering a substrate was obtained. The thickness of the soft touch layer of the sheet for covering a substrate obtained (the thickness of the sheet excluding the ABS sheet) was 80 μm.

EXAMPLE 23

The resin composition used in Example 4 was coated onto an ABS sheet B and dried at 80° C. for 5 minutes to form a soft touch layer, whereby a sheet for covering a substrate was obtained. The thickness of the soft touch layer of the sheet for covering a substrate obtained (the thickness of the sheet excluding the ABS sheet) was 60 μm.

EXAMPLE 24

The resin composition used in Example 5 was coated onto ABS sheet A and dried at 80° C. for 15 minutes to form a soft touch layer, whereby a sheet for covering a substrate was obtained. The thickness of the soft touch layer of the sheet for covering a substrate obtained (the thickness of the sheet excluding the ABS sheet) was 100 μm.

EXAMPLE 25

The resin composition used in Example 6 was coated onto ABS sheet A and dried at 80° C. for 20 minutes to form a soft touch layer, whereby a sheet for covering a substrate was obtained. The thickness of the soft touch layer of the sheet for covering a substrate obtained (the thickness of the sheet excluding the ABS sheet) was 60 μm.

EXAMPLE 26

The resin composition used in Example 7 was coated onto ABS sheet B and dried at 80° C. for 5 minutes to form a soft touch layer, whereby a sheet for covering a substrate was obtained. The thickness of the soft touch layer of the sheet for covering a substrate obtained (the thickness of the sheet excluding the ABS sheet) was 60 μm.

EXAMPLES 27, 28

Pressure-sensitive acrylic adhesive sheets (with a thickness of 20 μm) were laminated on the reverse surfaces of the sheets obtained in Examples 3 and 5 to form sheets for covering a substrate.

EXAMPLES 29 to 32

Adhesive sheets (with a thickness of 20 μm) shown in the following Table 18 were laminated on the reverse surfaces of the sheets obtained in Examples 17 to 20 to form sheets for covering a substrate.

EXAMPLE 33

The resin composition used in Example 1 was coated onto a surface of a PET sheet, whose surface had been treated so as to be released, by an applicator and dried at 70° C. for 10 minutes to form a soft touch layer. The thickness of the soft touch layer was 100 μm. Then, the PET sheet was peeled off from the soft touch layer, and PVC sheet B was laminated via Adhesive B on a surface of the soft touch layer from which the PET sheet was peeled off to obtain a sheet for covering a substrate.

EXAMPLE 34

The resin composition used in Example 2 was coated onto a surface of a PET sheet, whose surface had been treated so as to be released, by an applicator and dried at 80° C. for 20 minutes to form a soft touch layer. The thickness of the soft touch layer was 120 μm. Then, the PET sheet was peeled off from the soft touch layer, and ABS sheet B was laminated via Adhesive B on a surface of the soft touch layer from which the PET sheet was peeled off to obtain a sheet for covering a substrate.

EXAMPLE 35

The resin composition used in Example 3 was coated onto a surface of a PET sheet, whose surface had been treated so as to be released, by an applicator and dried at 70° C. for 10 minutes to form a soft touch layer. The thickness of the soft touch layer was 50 μm. Then, the PET sheet was peeled off from the soft touch layer, and PVC sheet B was laminated via Adhesive A on a surface of the soft touch layer from which the PET sheet was peeled off to obtain a sheet for covering a substrate.

EXAMPLE 36

The resin composition used in Example 4 was coated onto a surface of a PET sheet, whose surface had been treated so as to be released, by an applicator and dried at 70° C. for 10 minutes to form a soft touch layer. The thickness of the soft touch layer was 100 μm. Then, the PET sheet was peeled off from the soft touch layer, and PVC sheet B was laminated via Adhesive A on a surface of the soft touch layer from which the PET sheet was peeled off to obtain a sheet for covering a substrate.

EXAMPLE 37

The resin composition used in Example 5 was coated onto a surface of a PET sheet, whose surface had been treated so as to be released, by an applicator and dried at 70° C. for 10 minutes to form a soft touch layer. The thickness of the soft touch layer was 100 μm. Then, the PET sheet was peeled off from the soft touch layer, and PVC sheet B was laminated via Adhesive B on a surface of the soft touch layer from which the PET sheet was peeled off to obtain a sheet for covering a substrate.

EXAMPLE 38

The resin composition used in Example 6 was coated onto a surface of a PET sheet, whose surface had been treated so as to be released, by an applicator and dried at 80° C. for 10 minutes to form a soft touch layer. The thickness of the soft touch layer was 70 μm. Then, the PET sheet was peeled off from the soft touch layer, and ABS sheet B was laminated via Adhesive A on a surface of the soft touch layer from which the PET sheet was peeled off to obtain a sheet for covering a substrate.

EXAMPLE 39

The resin composition used in Example 7 was coated onto a surface of a PET sheet, whose surface had been treated so as to be released, by an applicator and dried at 80° C. for 20 minutes to form a soft touch layer. The thickness of the soft touch layer was 120 μm. Then, the PET sheet was peeled off from the soft touch layer, and ABS sheet B was laminated via Adhesive A on a surface of the soft touch layer from which the PET sheet was peeled off to obtain a sheet for covering a substrate.

EXAMPLE 40

The resin composition used in Example 8 was coated onto a surface of a PET sheet, whose surface had been treated so as to be released, by an applicator and dried at 80° C. for 20 minutes to form a soft touch layer. The thickness of the soft touch layer was 100 μm. Then, the PET sheet was peeled off from the soft touch layer, and ABS sheet B was laminated via Adhesive B on a surface of the soft touch layer from which the PET sheet was peeled off to obtain a sheet for covering a substrate.

EXAMPLE 41

| Urethane resin B: | 100 parts |
| Elastic beads B: | 150 parts |

The above-mentioned components were mixed with stirring to obtain a resin composition.

The resulting resin composition was coated onto Elastomer sheet C and dried at 80° C. for 30 minutes to form a soft touch layer. The thickness of the soft touch layer was 60 μm. Polyethylene foam sheet A was laminated on a reverse surface of Elastomer sheet C at 150° C. to obtain a sheet for covering a substrate.

EXAMPLE 42

| Urethane resin C: | 100 parts |
| Porous inorganic material A: | 25 parts |

The above-mentioned components were mixed with stirring to obtain a resin composition.

The resulting resin composition was coated onto Elastomer sheet D and dried at 80° C. for 30 minutes to form a soft touch layer. The thickness of the soft touch layer was 100 μm. Polyethylene foam sheet A was laminated on a reverse surface of Elastomer sheet D at 150° C. to obtain a sheet for covering a substrate.

EXAMPLE 43

| Urethane resin B: | 100 parts |
| Elastic beads B: | 220 parts |

The above-mentioned components were mixed with stirring to obtain a resin composition.

The resulting resin composition was coated onto Elastomer sheet E and dried at 80° C. for 30 minutes to form a soft touch layer. The thickness of the soft touch layer was 40 μm. Polyethylene foam sheet B was laminated on a reverse surface of Elastomer sheet E at 150° C. to obtain a sheet for covering a substrate.

EXAMPLE 44

| Urethane resin B: | 100 parts |
| Porous inorganic material B: | 20 parts |

The above-mentioned components were mixed with stirring to obtain a resin composition.

The resulting resin composition was coated onto a PVC foam sheet and dried at 80° C. for 5 minutes to form a soft touch layer, whereby a sheet was obtained. The thickness of a foamed resin layer and the soft touch layer of the sheet obtained was 500 μm and 100 μm, respectively.

Then, the face of the foamed resin layer side of the sheet obtained was laminated on Adhesive B being laminated on PVC sheet A, thereby obtaining a sheet for covering a substrate.

EXAMPLE 45

| Urethane resin C: | 100 parts |
| Elastic beads C: | 40 parts |

The above-mentioned components were mixed with stirring to obtain a resin composition.

The resulting resin composition was coated onto a PET sheet and dried at 80° C. for 15 minutes to foam a soft touch layer. The thickness of the soft touch layer was 100 μm. Then, the PET sheet was peeled off from the soft touch layer, and grain of stone patterns were printed by gravure printing on a surface of the soft touch layer from which the PET sheet was peeled off. Then, Adhesive A was laminated on the printed surface of the soft touch layer to obtain a sheet for covering a substrate.

EXAMPLE 46

| Urethane resin A: | 100 parts |
| Isocyanate A: | 10 parts |
| Curing catalyst: | 0.5 parts |
| Porous inorganic material A: | 20 parts |

The above-mentioned components were mixed with stirring to obtain a resin composition.

The resulting resin composition was coated onto a PET sheet and dried at 80° C. for 15 minutes to form a soft touch layer. The thickness of the soft touch layer was 100 μm. Then, the PET sheet was peeled off from the soft touch layer, and Adhesive A was laminated on the soft touch layer to obtain a sheet for covering a substrate.

EXAMPLE 47

| Urethane resin B: | 100 parts |
| Porous inorganic material C: | 30 parts |
| Carbon black: | 4 parts |

The above-mentioned resin components were mixed with stirring to obtain a resin composition.

The resulting resin composition was coated onto an ABS sheet A and dried at 80° C. for 5 minutes to form a soft touch layer. Then, Adhesive B was laminated on a reverse surface of the ABS sheet to obtain a sheet for covering a substrate. The thickness of the soft touch layer was 100 μm.

COMPARATIVE EXAMPLE

A soft touch paint (manufactured by Cashew Co., Ltd., CENOSOFT II) was coated onto an ABS sheet B so that the thickness of the covering film was 50 μm, and was cured by heating at 80° C. for 30 minutes.

(D) Production of a molding (D)—1 Injection press

Injection press was conducted, using the sheets for covering a substrate obtained in Examples 1, 2, 3, 5 to 7, 11, 12, and 17 to 20 in accordance with the following method.

A mold of a molding machine shown in FIGS. 1 to 5 has a cope 1, a drag 2, and a resin injection machine 6. On a lower face of the cope 1, a convex 11 is provided, and on an upper face of the drag 2, a concave 12 is provided so as to match with the convex 11. At the center of the drag 2, a resin injecting path 22 is formed, and a nozzle 61 of the resin injection machine 6 is provided so as to come into contact with the resin injecting path 22.

Figure 4:
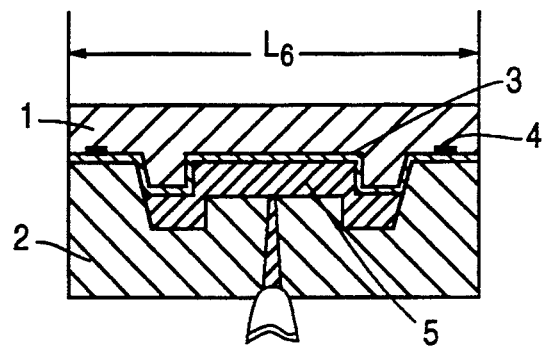
FIG. 4 is a cross-sectional view showing an example of the production of a molding by injection press using the sheet of the present invention for covering a substrate, and showing a state in which a cope is connected to the drag.
Figure 2:
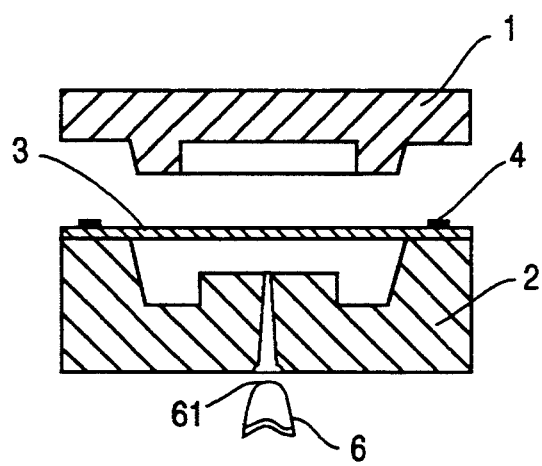
FIG. 2 is a cross-sectional view showing an example of the production of a molding by injection press using a sheet of the present invention for covering a substrate, and showing a state in which the sheet for covering a substrate is placed on an upper face of a drag.
Figure 5:
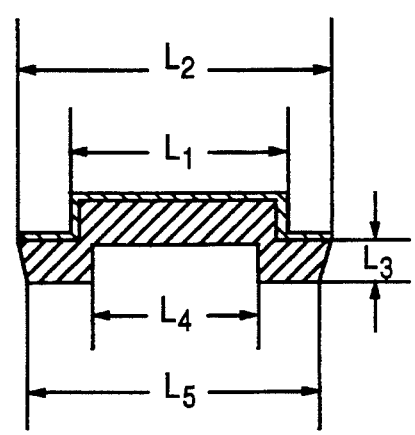
FIG. 5 is a cross-sectional view showing a molding obtained by injection press using the sheet of the present invention for covering a substrate.
Figure 3:
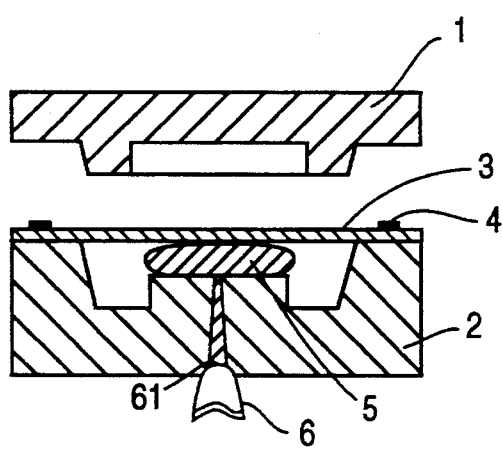
FIG. 3 is a cross-sectional view showing an example of the production of a molding by injection press using the sheet of the present invention for covering a substrate, and showing a state in which a molding resin is injected into the drag.
Figure 6:
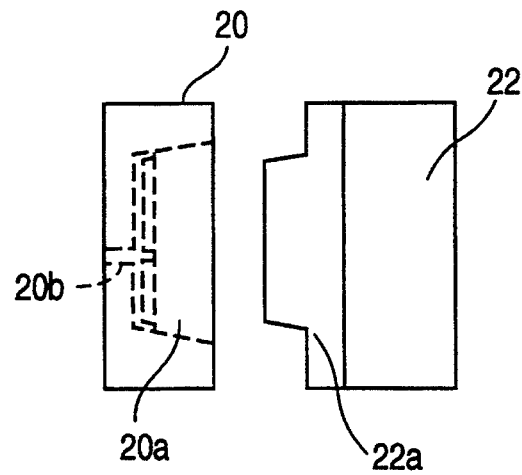
FIG. 6 is a front view showing the mold of an injection forming machine.

As shown in FIG. 2, a sheet 3 was placed between the cope 1 and the drag 2 which were heated to a predetermined temperature, and a periphery of the sheet 3 was fixed with fixing pins 4 on a periphery of the drag 2. Then, as shown in FIG. 3, a molding resin 5 was injected from the tip end of the nozzle 61 of the resin injection machine 6 into the drag 2. Then, as shown in FIG. 4, the sheet 3 was molded by connecting the cope 1 to the drag 2 under predetermined pressure and at the same time the resin 5 was molded by injection press, whereby a molding in a shape shown in FIG. 5 was obtained. In FIGS. 4 and 5, $L_1$ is 200 mm, $L_2$ is 300 mm, $L_3$ is 50 mm, $L_4$ is 150 mm, $L_5$ is 280 mm, and $L_6$ is 500 mm.

Molding resins, pressing pressure, mold temperature, and nozzle tip end temperature used in each example are respectively shown in Tables 1 to 4. Moreover, adhesion, soft touch feeling, and external appearance of the sheets for covering a substrate of the moldings obtained in the above were evaluated in accordance with the above method. The results are shown in Tables 1 to 4.

TABLE 1

| Example sheet | 1 | 2 |
| --- | --- | --- |
| Nozzle tip end temperature (°C.) | 230 | 220 |
| Molding resin | Polyethylene | Polyethylene |
| Pressing pressure (t) | 100 | 100 |
| Mold temperature (°C.) | 30 | 30 |
| Adhesion | 100 | 100 |
| Soft touch feeling | Good | Good |
| Appearance | Good | Good |

TABLE 2

| Example sheet | 3 | 5 | 6 | 7 |
| --- | --- | --- | --- | --- |
| Nozzle tip end temperature (°C.) | 240 | 240 | 230 | 240 |
| Molding resin | ABS | ABS | PS | ABS |
| Pressing pressure (t) | 120 | 120 | 120 | 120 |
| Mold temperature (°C.) | 35 | 30 | 35 | 35 |
| Adhesion | 100 | 100 | 100 | 100 |

TABLE 2-continued

| Example sheet | 3 | 5 | 6 | 7 |
| --- | --- | --- | --- | --- |
| Soft touch feeling | Good | Good | Good | Good |
| Appearance | Good | Good | Good | Good |

TABLE 3

| Example sheet | 11 | 12 |
| --- | --- | --- |
| Nozzle tip end temperature (°C.) | 240 | 240 |
| Molding resin | ABS | ABS |
| Pressing pressure (t) | 120 | 120 |
| Mold temperature (°C.) | 30 | 30 |
| Adhesion | 100 | 100 |
| Soft touch feeling | Good | Good |
| Appearance | Good | Good |

TABLE 4

| Example sheet | 17 | 18 | 19 | 20 |
| --- | --- | --- | --- | --- |
| Nozzle tip end temperature (°C.) | 220 | 230 | 230 | 240 |
| Molding resin | Polyethylene | PP | PP | ABS |
| Pressing pressure (t) | 100 | 100 | 100 | 120 |
| Mold temperature (°C.) | 30 | 30 | 30 | 30 |
| Adhesion | 100 | 100 | 100 | 100 |
| Soft touch feeling | Good | Good | Good | Good |
| Appearance | Good | Good | Good | Good |

(D)—2 Injection forming

Injection forming was conducted by an injection forming machine equipped with a mold shown in FIGS. 6 to 9, using the sheets for coating obtained in Examples 1, 2, 11, 12, 17 to 20, 3, 8, and 21 to 26 in accordance with the following method, thereby moldings were obtained.

This injection forming machine has a movable part of the mold 20 having a concave 20a for molding and a passage hole 20b for making the inside of the movable part of mold 20 a vacuum, a stationary part of the mold 22 with a convex 22a, a heating platen 24 having holes for vacuum forming and pressure forming, which is provided between the molds 20 and 22 and can be moved out of therebetween, and a resin injection machine 25.

Figure 7:
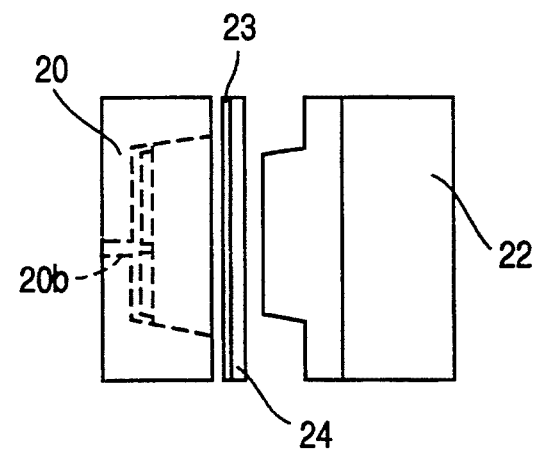
FIG. 7 is a front view showing an example of the production of a molding by injection forming using the sheet of the present invention for covering a substrate, and showing a state in which the sheet for covering a substrate is disposed between a movable part of the mold and a stationary part of the mold.
Figure 8:
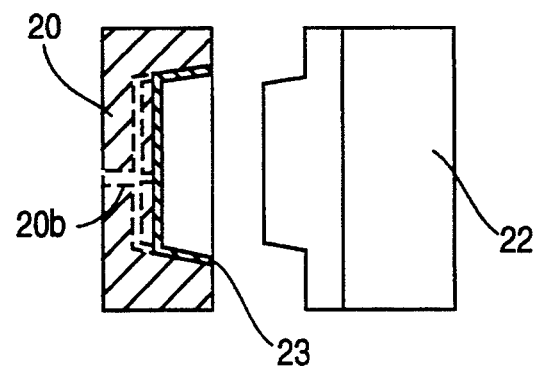
FIG. 8 is a front view including a partial cross-section showing an example of the production of a molding by injection forming using the sheet of the present invention for covering a substrate, and showing a state in which the sheet for covering a substrate is disposed on an inner face of the movable part of the mold.
Figure 9:
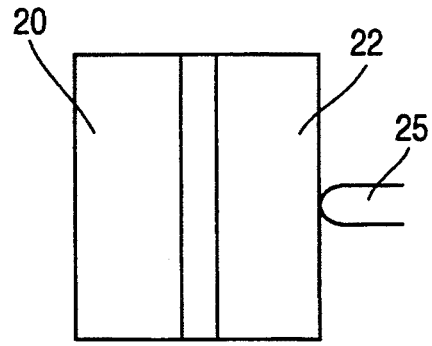
FIG. 9 is a front view showing an example of the production of a molding by injection forming using the sheet of the present invention for covering a substrate, and showing a state in which the movable part of the mold is moved to the stationary part of the mold to be connected thereto.

First, as shown in FIG. 7, a sheet for covering a substrate 23 was placed between the movable part of the mold 20 and the heating platen 24. Then, the sheet 23 was heated with the heating platen 24, and was subjected to vacuum forming and/or pressure forming, whereby the sheet 23 was brought into contact with an inner face of the concave 20a of the mold 20. Then, as shown in FIGS. 8 and 9, the heating platen 24 was taken out from between the molds 20 and 22, after which the mold 20 was moved into the fixed mold 22, whereby the molds 20 and 22 were connected to each other. Then, a molding resin was injected from the resin injection machine 25 into the cavity formed by the molds 20 and 22. After the molding, a molding was taken out of the molds to obtain a injection molding.

Molding temperature, nozzle tip end temperature, method for forming a sheet, and molding resin in each Example are respectively shown in Tables 5 to 9.

Adhesion of the sheet for covering a substrate on a surface of the resulting molding, soft touch feeling, and appearance were evaluated in the same manner as the above. The results are shown in Tables 5 to 9.

Molding tests were conducted using the sheet obtained in Comparative Example and an ABS resin as a molding resin in the same method as in the above Examples. The results are shown in Table 10. Because of poor extensibility of the sheet, the sheet could not be formed into a shape of the mold and cracks were formed in the sheet when the resin was injected.

TABLE 5

| Example sheet | 1 | 2 |
|---|---|---|
| Nozzle tip end temperature (°C.) | 230 | 220 |
| Temperature for forming a sheet (°C.) | 50 | 50 |
| Method for forming a sheet | Vacuum and pressure | Vacuum |
| Molding resin | Polystyrene | Polyethylene |
| Adhesion | 100 | 100 |
| Soft touch feeling | Good | Good |
| Appearance | Good | Good |

TABLE 6

| Example sheet | 11 | 12 |
|---|---|---|
| Nozzle tip end temperature (°C.) | 240 | 240 |
| Temperature for forming a sheet (°C.) | 130 | 130 |
| Method for forming a sheet | Vacuum and pressure | Vacuum and pressure |
| Molding resin | ABS | ABS |
| Adhesion | 100 | 100 |
| Soft touch feeling | Good | Good |
| Appearance | Good | Good |

TABLE 7

| Example sheet | 17 | 18 | 19 | 20 |
|---|---|---|---|---|
| Nozzle tip end temperature (°C.) | 220 | 230 | 230 | 240 |
| Temperature for forming a sheet (°C.) | 140 | 155 | 155 | 130 |
| Method for forming a sheet | Vacuum and pressure | Vacuum and pressure | Vacuum | Pressure |
| Molding resin | Polyethylene | PP | PP | ABS |
| Adhesion | 100 | 100 | 100 | 100 |
| Soft touch feeling | Good | Good | Good | Good |
| Appearance | Good | Good | Good | Good |

TABLE 8

| Example sheet | 21 | 22 | 3 | 23 |
|---|---|---|---|---|
| Nozzle tip end temperature (°C.) | 240 | 240 | 240 | 240 |
| Temperature for forming a sheet (°C.) | 150 | 170 | 150 | 150 |
| Method for forming a sheet | Vacuum and pressure | Vacuum and pressure | Vacuum and pressure | Vacuum and pressure |
| Molding resin | ABS | ABS | ABS | ABS |
| Adhesion | 100 | 100 | 100 | 100 |
| Soft touch feeling | Good | Good | Good | Good |
| Appearance | Good | Good | Good | Good |

TABLE 9

| Example sheet | 24 | 25 | 26 | 8 |
|---|---|---|---|---|
| Nozzle tip end temperature (°C.) | 240 | 240 | 240 | 240 |
| Temperature for forming a sheet (°C.) | 150 | 170 | 150 | 150 |
| Method for forming a sheet | Vacuum and pressure | Vacuum and pressure | Vacuum and pressure | Vacuum |
| Molding resin | ABS | ABS | ABS | ABS |
| Adhesion | 100 | 100 | 100 | 100 |
| Soft touch feeling | Good | Good | Good | Good |
| Appearance | Good | Good | Good | Good |

TABLE 10

| | |
|---|---|
| Nozzle tip end temperature (°C.) | 240 |
| Temperature for forming a sheet (°C.) | 170 |
| Method for forming a sheet | Vacuum and pressure |
| Molding resin | ABS |
| Adhesion | 100 |
| Soft touch feeling | Good |
| Appearance | Cracks on surface |

(D)—3 Extrusion molding

Extrusion molding was conducted by an extruder, using resins respectively shown in the following tables 11 to 14 as a molding resin and dies having tip end temperatures shown in Tables 11 to 14, whereby moldings in a plate with a width of 5 cm and a thickness of 2 mm were obtained.

The sheets obtained in the above Examples 1, 2, 3, 5 to 7, 11, 12, and 17 to 20 were successively laminated on the surfaces of the above-mentioned plate-shaped moldings, Which were shortly after the extrusion and were not cured yet and were successively moving, so as to cover the peripheries of the reverse surfaces thereof by using a silicon roller. Then, the laminated moldings were passed through a sizing die and cooled, whereby coated moldings in which the sheets were laminated on the surfaces and the peripheries of the reverse surfaces of the moldings were obtained.

Adhesion, soft touch feeling, and appearance of the sheet for covering a substrate of the resulting moldings were evaluated in the same manner as in the above. The results are shown in Tables 11 to 14.

TABLE 11

| Example sheet | 1 | 2 |
|---|---|---|
| Die tip end temperature (°C.) | 240 | 200 |
| Molding resin | Acrylic resin | Vinyl chloride resin |
| Adhesion | 100 | 100 |
| Soft touch feeling | Good | Good |
| Appearance | Good | Good |

TABLE 12

| Example sheet | 3 | 5 | 6 | 7 |
|---|---|---|---|---|
| Die tip end temperature (°C.) | 240 | 240 | 200 | 230 |
| Molding resin | ABS | ABS | Vinyl chloride resin | PS |
| Adhesion | 100 | 100 | 100 | 100 |
| Soft touch feeling | Good | Good | Good | Good |
| Appearance | Good | Good | Good | Good |

TABLE 13

| Example sheet | 11 | 12 |
|---|---|---|
| Die tip end temperature (°C.) | 240 | 240 |

TABLE 13-continued

| Example sheet | 11 | 12 |
|---|---|---|
| Molding resin | ABS | ABS |
| Adhesion | 100 | 100 |
| Soft touch feeling | Good | Good |
| Appearance | Good | Good |

TABLE 14

| Example sheet | 17 | 18 | 19 | 20 |
|---|---|---|---|---|
| Die tip end temperature (°C.) | 230 | 245 | 245 | 235 |
| Extrusion resin | Polyethylene | PP | PP | ABS |
| Adhesion | 100 | 100 | 100 | 100 |
| Soft touch feeling | Good | Good | Good | Good |
| Appearance | Good | Good | Good | Good |

(D)—4 Pultrusion

First, a material for molding comprising a mixture including 100 parts of polyester (manufactured by Japan Upika Co., Ltd.: Trade name "UPIKA 3510"), 2 parts of benzoyl peroxide, 1 part of stearate, 40 parts of calcium carbonate, and 25 parts of glass roving fiber (manufactured by Central Glass Co., Ltd.) was provided to a die heated to 150° C. to 170° C., whereby moldings were successively formed by pultrusion.

The sheets obtained in Examples 1, 2, 9, and 14 and Examples 27 to 32 were successively adhered to the surfaces of the resulting pultrusion molds, whereby laminated moldings were obtained.

Adhesion, soft touch feeling, and external appearance of the sheets for covering a substrate of the resulting moldings were evaluated in the same way as in the above. The results are shown in

TABLE 15

| Example sheet | 1 | 2 |
|---|---|---|
| Adhesion | 100 | 100 |
| Soft touch feeling | Good | Good |
| Appearance | Good | Good |

TABLE 16

| Example sheet | 9 | 14 |
|---|---|---|
| Adhesion | 100 | 100 |
| Soft touch feeling | Good | Good |
| Appearance | Good | Good |

TABLE 17

| Example sheet | 27 | 28 |
|---|---|---|
| Adhesion | 100 | 100 |
| Soft touch feeling | Good | Good |
| Appearance | Good | Good |

TABLE 18

| Example sheet | 29 | 30 | 31 | 32 |
|---|---|---|---|---|
| Adhesive layer | Polyester type hot-melt adhesive | Polyester type hot-melt adhesive | Polyester type hot-melt adhesive | Pressure sensitive acrylic adhesive |
| Adhesion | 100 | 100 | 100 | 100 |
| soft touch feeling | Good | Good | Good | Good |
| Appearance | Good | Good | Good | Good |

(D)—5 Forming by using a sheet for covering a substrate alone

The respective sheets obtained in Examples 33 to 44 were introduced into a mold and formed by either one of the methods of vacuum forming, pressure forming, and vacuum forming and pressure forming at sheet forming temperatures shown in Tables 19 to 21 to obtain moldings. The shape of the moldings were made 150 mm (length)×150 mm (width)×50 mm (thickness) (Each radius of curvature R was 10 mm).

Each molding was taken out of the mold, and adhesion between the soft touch layer and the thermoplastic resin or the elastomer layer, soft touch feeling and external appearance were evaluated in the same way as the above. The results are shown in Tables 19 to 21.

Moreover, a molding was obtained by using the sheet of the Comparative Example in the same way as in the above Examples. The results are shown in Table 22. Because of poor extensibility of the sheet, the sheet could not be formed into the shape of the mold, and cracks were formed in the soft touch layer.

TABLE 19

| Example sheet | 33 | 34 | 35 | 36 |
|---|---|---|---|---|
| Thermoplastic resin layer | PVC sheet B | ABS sheet B | PVC sheet B | PVC sheet B |
| Adhesive layer | B | B | A | A |
| Temperature for forming a sheet (°C.) | 150 | 150 | 150 | 170 |
| Method for forming a sheet | Pressure | Vacuum and pressure | Vacuum and pressure | Vacuum and pressure |
| Adhesion | 100 | 100 | 100 | 100 |
| Soft touch feeling | Good | Good | Good | Good |
| Appearance | Good | Good | Good | Good |

TABLE 20

| Example sheet | 37 | 38 | 39 | 40 |
|---|---|---|---|---|
| Thermoplastic resin layer | PVC sheet B | ABS sheet B | ABS sheet B | ABS sheet B |
| Adhesive layer | B | A | A | B |
| Temperature for forming a sheet (°C.) | 150 | 150 | 170 | 150 |
| Method for forming a sheet | Vacuum | Vacuum and pressure | Vacuum and pressure | Vacuum |
| Adhesion | 100 | 100 | 100 | 100 |
| Soft touch feeling | Good | Good | Good | Good |
| Appearance | Good | Good | Good | Good |

TABLE 21

| Example sheet | 41 | 42 | 43 | 44 |
|---|---|---|---|---|
| Temperature for forming a sheet (°C.) | 160 | 160 | 160 | 200 |
| Method for forming a sheet | Vacuum | Vacuum | Vacuum | Vacuum |
| Adhesion | 100 | 100 | 100 | 100 |
| Soft touch feeling | Good | Good | Good | Good |
| Appearance | Good | Good | Good | Good |

TABLE 22

| | |
|---|---|
| Temperature for forming a sheet (°C.) | 170 |
| Method for forming a sheet | Vacuum and pressure |
| Adhesion | 100 |
| Soft touch feeling | Good |
| Appearance | Cracks on surface |

(D)—6 Method for adhering a sheet by hand

As an substrate, a steel plate curved in a convex lens shape (with a radius curvature of 50 cm and a diameter of a bottom surface of 30 cm) was used. Each sheet for covering a substrate obtained in Examples 45 and 46 was adhered to the convex surface.

Adhesion, soft touch feeling, and appearance of each sheet were evaluated in the same way as the above. The results are shown in Table 23.

(D)—7 Method for adhering by SMC

The sheet for covering a substrate obtained in Example 47 was placed in a concave portion of a mold consisting of a convex and a concave. Then, a sheet molding compound (SMC) of an unsaturated polyester resin type was introduced into the die (150° C.), after which the convex was connected to the concave portion, whereby the sheet for covering a substrate was adhered to the SMC.

Adhesion, soft touch feeling and appearance of the sheet were evaluated in the same way as the above. The results are shown in Table 23.

TABLE 23

| Example sheet | 45 | 46 | 47 |
| --- | --- | --- | --- |
| Method for adhering | by hand | by hand | simultaneously with the SMC |
| Adhesion with respect to substrate | 100 | 100 | 100 |
| Soft touch feeling | Good | Good | Good |
| Appearance | Good | Good | Good |

We claim:

1. A sheet for covering a substrate comprising a soft touch layer formed from a resin composition and a foamed resin layer which is formed on one surface of the soft touch layer, wherein the resin composition contains, as its main components, a urethane resin with a glass transition temperature in the range of −50° C. to 20° C. and at least one substance selected from the group consisting of elastic beads and a porous inorganic material.

2. A sheet for covering a substrate according to claim 1, wherein the elastic beads are made of a synthetic resin, and the resin composition contains elastic beads in an amount in the range of 20 to 400 parts by weight based on 100 parts by weight of the urethane resin.

3. A sheet for covering a substrate according to claim 2, wherein the elastic beads are made of a resin selected from the group consisting of polyurethane, acrylic resin, polyamide, silicone resin, fluorocarbon resin, urea resin, nylon resin, polyethylene resin, styrene resin, and styrene-isoprene copolymer.

4. A sheet for covering a substrate according to claim 2, wherein the elastic beads have a local maximum of a particle diameter distribution in the range of 1 to 50 μm.

5. A sheet for covering a substrate according to claim 1, wherein the resin composition contains the porous inorganic material in an amount in the range of 5 to 60 parts by weight based on 100 parts by weight of the urethane resin.

6. A sheet for covering a substrate according to claim 1, wherein the porous inorganic material has an oil absorption in the range of 100 to 400 ml/100 g and an average particle diameter of 1 to 20 μm.

7. A sheet for covering a substrate according to claim 1, which is adhered to a surface of a substrate.

8. A sheet for covering a substrate according to claim 1, which is introduced into a mold and is adhered to a surface of a substrate formed from a resin in the mold.

9. A method for producing a molding having a substrate made of a resin and a covering film formed on a surface of the substrate, comprising the steps of:
introducing a sheet for covering a substrate according to claim 1 into a mold so that the soft touch layer is positioned on a surface side of the molding;
introducing a molding resin into the mold; and
molding the covering sheet and the molding resin in the mold to form the covering film and the substrate, respectively.

10. A method for producing a molding having a substrate made of a resin and a covering film formed on a surface of the substrate according to claim 9, wherein the elastic beads are made of a synthetic resin, and the resin composition contains the elastic beads in an amount in the range of 20 to 400 parts by weight based on 100 parts by weight of the urethane resin.

11. A method for producing a molding having a substrate made of a resin and a covering film formed on a surface of the substrate, comprising the steps of:
previously molding a sheet for covering a substrate according to claim 11 in a mold by vacuum forming and/or pressure forming so that the soft touch layer is positioned on a surface side of the molding;
introducing a molding resin into the mold; and
molding the covering sheet and the molding resin in the mold to form the covering film and the substrate, respectively.

12. A method for producing a molding having a substrate made of a resin and a covering film formed on a surface of the substrate according to claim 11, wherein the elastic beads are made of a solid synthetic resin, and the resin composition contains the elastic beads in an amount in the range of 20 to 400 parts by weight based on 100 parts by weight of the urethane resin.

13. A method for producing a molding having a substrate made of a resin and a covering film formed on a surface of the substrate according to claim 11, wherein a resin base layer is further formed between the foamed resin layer and the soft touch layer.

14. A method for producing a molding having a substrate made of a resin and a covering film formed on a surface of the substrate according to claim 13, wherein the elastic beads are made of a solid synthetic resin, and the resin composition contains the elastic beads in an amount in the range of 20 to 400 parts by weight based on 100 parts by weight of the urethane resin.

15. A sheet for covering a substrate comprising a soft touch layer formed from a resin composition and a resin base layer which is formed on one surface of the soft touch layer, wherein the resin composition contains, as its main components, a urethane resin with a glass transition temperature in the range of −50° C. to 20° C. and at least one substance Selected from the group consisting of elastic beads and a porous inorganic material.

16. A sheet for covering a substrate according to claim 15, wherein the elastic beads are made of a synthetic resin, and the resin composition contains the elastic beads in an amount in the range of 20 to 400 parts by weight based on 100 parts by weight of the urethane resin.

17. A sheet for covering a substrate according to claim 16, wherein the elastic beads have a local maximum of a particle diameter distribution in the range of 1 to 50 μm.

18. A sheet for covering a substrate according to claim 15, wherein the resin composition contains the porous inorganic material in an amount in the range of 5 to 60 parts by weight based on 100 parts by weight of the urethane resin.

19. A sheet for covering a substrate according to claim 15, wherein a foamed resin layer is further formed on the surface of the resin base layer.

20. A sheet for covering a substrate according to claim 19, wherein the elastic beads are made of a synthetic resin, and the resin composition contains the elastic beads in an amount in the range of 20 to 400 parts by weight based on 100 parts by weight of the urethane resin.

21. A sheet for covering a substrate according to claim 20, wherein the elastic beads have a local maximum of a particle diameter distribution in the range of 1 to 50 μm.

22. A method for producing a molding comprising the step of forming a sheet for covering a substrate according to claim 15 along a face of a mold by vacuum forming and/or pressure forming so that the soft touch layer becomes a surface of the molding.

23. A method for producing a molding according to claim 22, wherein the elastic beads are made of a synthetic resin, and the resin composition contains the elastic beads in an amount in the range of 20 to 400 parts by weight based on 100 parts by weight of the urethane resin.

24. A method for producing a molding according to claim 22, wherein a foamed resin layer is further formed on the surface of the resin base layer.

25. A method for producing a molding according to claim 24, wherein the elastic beads are made of a synthetic resin, and the resin composition contains the elastic beads in an amount in the range of 20 to 400 parts by weight based on 100 parts by weight of the urethane resin.

26. A method for producing a molding having a substrate made of a resin and a covering film formed on a surface of the substrate, comprising the steps of:
introducing a sheet for covering a substrate according to claim 15 into a mold so that the soft touch layer is positioned on a surface side of the molding;
introducing a molding resin into the mold; and
molding the covering sheet and the molding resin in the mold to form the covering film and the substrate, respectively.

27. A method for producing a molding having a substrate made of a resin and a covering film formed on a surface of the substrate according to claim 26, wherein the elastic beads are made of a synthetic resin, and the resin composition contains the elastic beads in an amount in the range of 20 to 400 parts by weight based on 100 parts by weight of the urethane resin.

28. A method for producing a molding having a substrate made of a resin and a covering film formed on a surface of the substrate according to claim 26, wherein a foamed resin layer is formed on a surface of the resin base layer.

29. A method for producing a molding having a substrate made of a resin and a covering film formed on a surface of the substrate according to claim 28, wherein the elastic beads are made of a solid synthetic resin, and the resin composition contains the elastic beads in an amount in the range of 20 to 400 parts by weight based on 100 parts by weight of the urethane resin.

* * * * *

UNITED STATES PATENT AND TRADEMARK OFFICE
CERTIFICATE OF CORRECTION

PATENT NO. : 5,354,397

DATED : October 11, 1994

INVENTOR(S) : Akitaka Miyake, et al.

It is certified that error appears in the above-identified patent and that said Letters Patent is hereby corrected as shown below:

Drawings:

In left position of Figure 8, the broken lines should be solid lines.

Signed and Sealed this

Ninth Day of May, 1995

Attest:

BRUCE LEHMAN

Attesting Officer

Commissioner of Patents and Trademarks